United States Patent
Jaaskelainen et al.

(10) Patent No.: US 11,131,185 B1
(45) Date of Patent: Sep. 28, 2021

(54) SYSTEM AND METHOD FOR DEPLOYING FIBER OPTICS LINES IN A WELLBORE

(71) Applicant: HALLIBURTON ENERGY SERVICES, INC., Houston, TX (US)

(72) Inventors: Mikko Jaaskelainen, Katy, TX (US); Brian Vandellyn Park, Santa Fe, NM (US); John L. Maida, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/832,333

(22) Filed: Mar. 27, 2020

(51) Int. Cl.
| | |
|---|---|
| *E21B 23/14* | (2006.01) |
| *E21B 47/135* | (2012.01) |
| *E21B 49/00* | (2006.01) |
| *E21B 23/01* | (2006.01) |
| *E21B 23/00* | (2006.01) |
| *E21B 33/12* | (2006.01) |
| *E21B 47/07* | (2012.01) |
| *E21B 43/26* | (2006.01) |
| *E21B 17/20* | (2006.01) |
| *G01V 8/16* | (2006.01) |
| *E21B 47/06* | (2012.01) |

(52) U.S. Cl.
CPC ............ *E21B 49/00* (2013.01); *E21B 17/206* (2013.01); *E21B 23/001* (2020.05); *E21B 23/01* (2013.01); *E21B 33/12* (2013.01); *E21B 43/26* (2013.01); *E21B 47/06* (2013.01); *E21B 47/07* (2020.05); *G01V 8/16* (2013.01); *E21B 43/2607* (2020.05)

(58) Field of Classification Search
CPC .......... E21B 23/14; E21B 43/26; E21B 47/01; E21B 47/12; E21B 47/135; E21B 33/12
See application file for complete search history.

(56) References Cited

U.S. PATENT DOCUMENTS

| | | | | | |
|---|---|---|---|---|---|
| 3,547,406 | A | * | 12/1970 | Fowler | E21B 23/14 254/134.4 |
| 7,219,730 | B2 | * | 5/2007 | Tilton | E21B 47/135 166/255.1 |
| 9,476,274 | B2 | * | 10/2016 | Edmonstone | E21B 23/14 |
| 10,563,473 | B2 | * | 2/2020 | Volgmann | E21B 17/206 |
| 10,823,931 | B2 | * | 11/2020 | Nitsche | F17D 3/01 |

(Continued)

FOREIGN PATENT DOCUMENTS

| | | |
|---|---|---|
| WO | 2018070980 A1 | 4/2018 |
| WO | 2019138236 A1 | 7/2019 |

OTHER PUBLICATIONS

International Search Report, Response and Written Opinion, PCT Application No. PCT/US2020/031076, dated Oct. 20, 2020.

*Primary Examiner* — Kenneth L Thompson
(74) *Attorney, Agent, or Firm* — Polsinelli PC (57) ABSTRACT

Aspects of the subject technology relate to systems and methods for deploying fiber optic lines in a wellbore using a fiber optic deployment device. The device can include at least one fiber optic spool forming a canister. The canister can be operable to self-propel through at least a portion of the wellbore. Each of the at least one fiber optic spool can comprising one or more fiber optic lines. Each of the one or more fiber optic lines can be coupled to a bridge plug at a first end and coupled to a cable at a second end opposite the first end. The device can include a sleeve covering the at least one fiber optic spool.

20 Claims, 9 Drawing Sheets

(56) References Cited

U.S. PATENT DOCUMENTS

| | | | |
|---|---|---|---|
| 10,883,810 B2 * | 1/2021 | Bouldin | E21B 47/092 |
| 11,002,093 B2 * | 5/2021 | Bouldin | E21B 41/0085 |
| 2008/0272931 A1 | 11/2008 | Auzerais et al. | |
| 2011/0079401 A1 | 4/2011 | Gambier | |
| 2016/0215578 A1 | 7/2016 | Adnan et al. | |
| 2019/0284890 A1 * | 9/2019 | Purkis | G02B 6/502 |

* cited by examiner

SYSTEM AND METHOD FOR DEPLOYING FIBER OPTICS LINES IN A WELLBORE

TECHNICAL FIELD

The present technology pertains to fiber optic lines in a wellbore, and more particularly, to deploying fiber optic lines within a casing of the wellbore and monitoring the wellbore or an adjacent wellbore using the fiber optic lines.

BACKGROUND

Completion of a wellbore through hydraulic fracturing is a complex process. The hydraulic fracturing process includes a number of different variables that can be altered to perform a well completion. Conventional methods and systems for monitoring and/or controlling the fracturing process include deploying optical fiber in an annular space between the wellbore and a casing. However, deployment and/or replacement of such conventional systems are time consuming, expensive to deploy, subject to damage, and limited to a size of the annular space. Further, such conventional systems are limited to vertical wells.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Disclosed are systems and methods for deploying fiber optic lines in a wellbore.

According to at least one aspect, an example fiber optic deployment device is provided. The device can include at least one fiber optic spool forming a canister. The canister can be operable to self-propel through at least a portion of the wellbore. Each of the at least one fiber optic spool can comprise one or more fiber optic lines. Each of the one or more fiber optic lines can couple to a bridge plug at a first end and couple to a cable at a second end opposite the first end. The device can include a sleeve covering the at least one fiber optic spool. Each of the one or more fiber optic lines can be dispersed from the corresponding at least one fiber optic spool when a bridge plug is secured within the wellbore and a cable is pulled to a surface of the wellbore.

According to at least one aspect, an example method for deploying fiber optic lines in a wellbore is provided. The method can include propelling a fiber optic deployment device through at least a portion of the wellbore. The fiber optic deployment device can comprising at least one fiber optic spool forming a canister. Each of the at least one fiber optic spool can comprise the one or more fiber optic lines. Each of the one or more fiber optic lines can be to a bridge plug at a first end and coupled to a cable at a second end opposite the first end. The device can include a sleeve covering the at least one fiber optic spool. The method can include securing the bridge plug to the wellbore. The method can include pulling the cable to a surface of the wellbore, thereby dispersing each of the one or more fiber optic lines from the corresponding at least one fiber optic spool.

According to at least one aspect, an example method for controlling a fracturing operation in a control wellbore is provided. The method can include deploying one or more fiber optic lines in a monitoring wellbore. The monitoring wellbore can be adjacent to the control wellbore. The one or more fiber optic lines can be deployed by a fiber optic deployment device. The device can comprise at least one fiber optic spool forming a canister. Each of the at least one fiber optic spool can comprise the one or more fiber optic lines. Each of the one or more fiber optic lines can be coupled to a bridge plug at a first end and coupled to a cable at a second end opposite the first end. The device can include a sleeve covering the at least one fiber optic spool. Each of the one or more fiber optic lines can be dispersed from the corresponding at least one fiber optic spool when a bridge plug is secured within the monitoring wellbore and a cable is pulled to a surface of the monitoring wellbore. The method can include receiving measurement data from each of the one or more fiber optic lines by a computer. The data can correspond to characteristics of the control wellbore. The method can include determining at least one control by the computer. The method can include controlling the fracturing operation in the control wellbore by a controller, the controller receiving and executing the at least one control.

Figure 1:
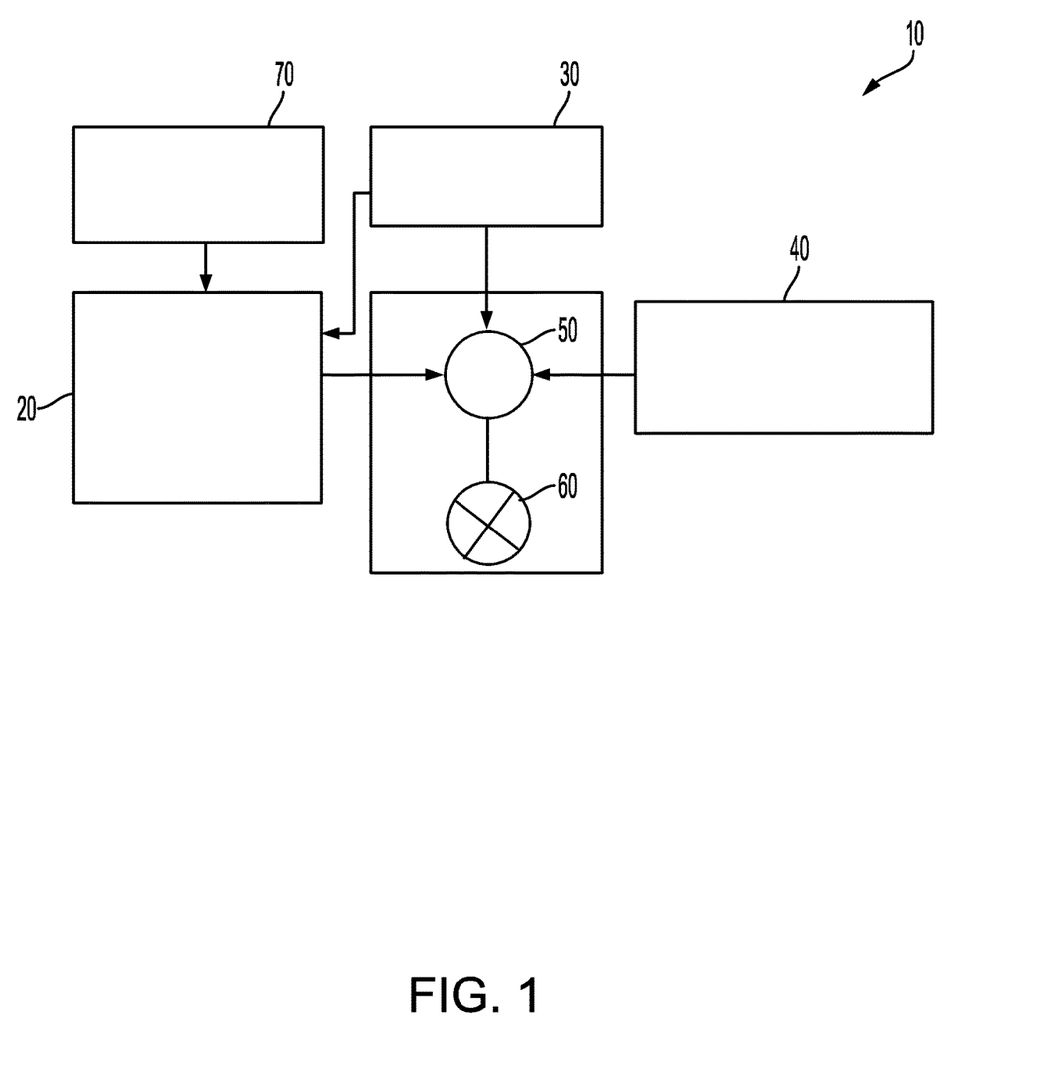
FIG. 1 is a schematic diagram of an example fracturing system, in accordance with various aspects of the subject technology.

Turning now to FIG. 1, an example fracturing system 10 is shown. The fracturing system 10 includes a fracturing fluid producing apparatus 20, a fluid source 30, a solid source 40, and a pump and blender system 50. All or an applicable combination of these components of the fracturing system 10 can reside at the surface at a well site/fracturing pad where a well 60 is located.

During a fracturing job, the fracturing fluid producing apparatus 20 can access the fluid source 30 for introducing/controlling flow of a fluid, e.g. a fracturing fluid, in the fracturing system 10. While only a single fluid source 30 is shown, the fluid source 30 can include a plurality of separate fluid sources. Further, the fracturing fluid producing apparatus 20 can be omitted from the fracturing system 10. In turn, the fracturing fluid can be sourced directly from the fluid source 30 during a fracturing job instead of through the intermediary fracturing fluid producing apparatus 20.

The fracturing fluid can be an applicable fluid for forming fractures during a fracture stimulation treatment of the well 60. For example, the fracturing fluid can include water, a hydrocarbon fluid, a polymer gel, friction reducers, proppant, diverters, foam, air, wet gases, and/or other applicable fluids. In various embodiments, the fracturing fluid can include a concentrate to which additional fluid is added prior to use in a fracture stimulation of the well 60. In certain embodiments, the fracturing fluid can include a gel pre-cursor with fluid, e.g. liquid or substantially liquid, from fluid source 30. Accordingly, the gel pre-cursor with fluid can be mixed by the fracturing fluid producing apparatus 20 to produce a viscous fracturing fluid for forming fractures.

The solid source 40 can include a volume of one or more solids for mixture with a fluid, e.g. the fracturing fluid, to form a solid-laden fluid. The solid-laden fluid can be pumped into the well 60 as part of a solids-laden fluid stream that is used to form and stabilize fractures in the well 60 during a fracturing job. The one or more solids within the solid source 40 can include applicable solids that can be added to the fracturing fluid of the fluid source 30. Specifically, the solid source 40 can contain one or more proppants for stabilizing fractures after they are formed during a fracturing job, e.g. after the fracturing fluid flows out of the formed fractures. For example, the solid source 40 can contain sand, ceramic proppant and/or other solid materials.

The fracturing system 10 can also include additive source 70. The additive source 70 can contain/provide one or more applicable additives that can be mixed into fluid, e.g. the fracturing fluid, during a fracturing job. For example, the additive source 70 can include solid-suspension-assistance agents, gelling agents, weighting agents, friction reducers and/or other optional additives to alter the properties of the fracturing fluid. The additives can be included in the fracturing fluid to reduce pumping friction, to reduce or eliminate the fluid's reaction to the geological formation in which the well is formed, to operate as surfactants, and/or to serve other applicable functions during a fracturing job. The additives can function to maintain solid particle suspension in a mixture of solid particles and fracturing fluid as the mixture is pumped down the well 60 to one or more perforations.

The pump and blender system 50 functions to pump fracture fluid into the well 60. Specifically, the pump and blender system 50 can pump fracture fluid from the fluid source 30, e.g. fracture fluid that is received through the fracturing fluid producing apparatus 20, into the well 60 for forming and potentially stabilizing fractures as part of a fracture job. The pump and blender system 50 can include one or more pumps. Specifically, the pump and blender system 50 can include a plurality of pumps that operate together, e.g. concurrently, to form fractures in a subterranean formation as part of a fracturing job. The one or more pumps included in the pump and blender system 50 can be an applicable type of fluid pump. For example, the pumps in the pump and blender system 50 can include electric pumps and/or gas powered pumps.

The pump and blender system 50 can also function to receive the fracturing fluid and combine it with other components and solids. Specifically, the pump and blender system 50 can combine the fracturing fluid with volumes of solid particles, e.g. proppant, from the solid source 40 and/or additional fluid and solids from the additive source 70. In turn, the pump and blender system 50 can pump the resulting mixture down the well 60 at a sufficient pumping rate to create or enhance one or more fractures in a subterranean zone, for example, to stimulate production of fluids from the zone. While the pump and blender system 50 is described to perform both pumping and mixing of fluids and/or solid particles, in various embodiments, the pump and blender system 50 can function to just pump a fluid stream, e.g. a fracture fluid stream, down the well 60 to create or enhance one or more fractures in a subterranean zone.

The fracturing fluid producing apparatus 20, fluid source 30, and/or solid source 40 can be equipped with one or more monitoring devices (not shown). The monitoring devices can be used to control the flow of fluids, solids, and/or other compositions to the pumping and blender system 50. Such monitoring devices can effectively allow the pumping and blender system 50 to source from one, some or all of the different sources at a given time. In turn, the pumping and blender system 50 can provide just fracturing fluid into the well at some times, just solids or solid slurries at other times, and combinations of those components at yet other times.

Figure 2:
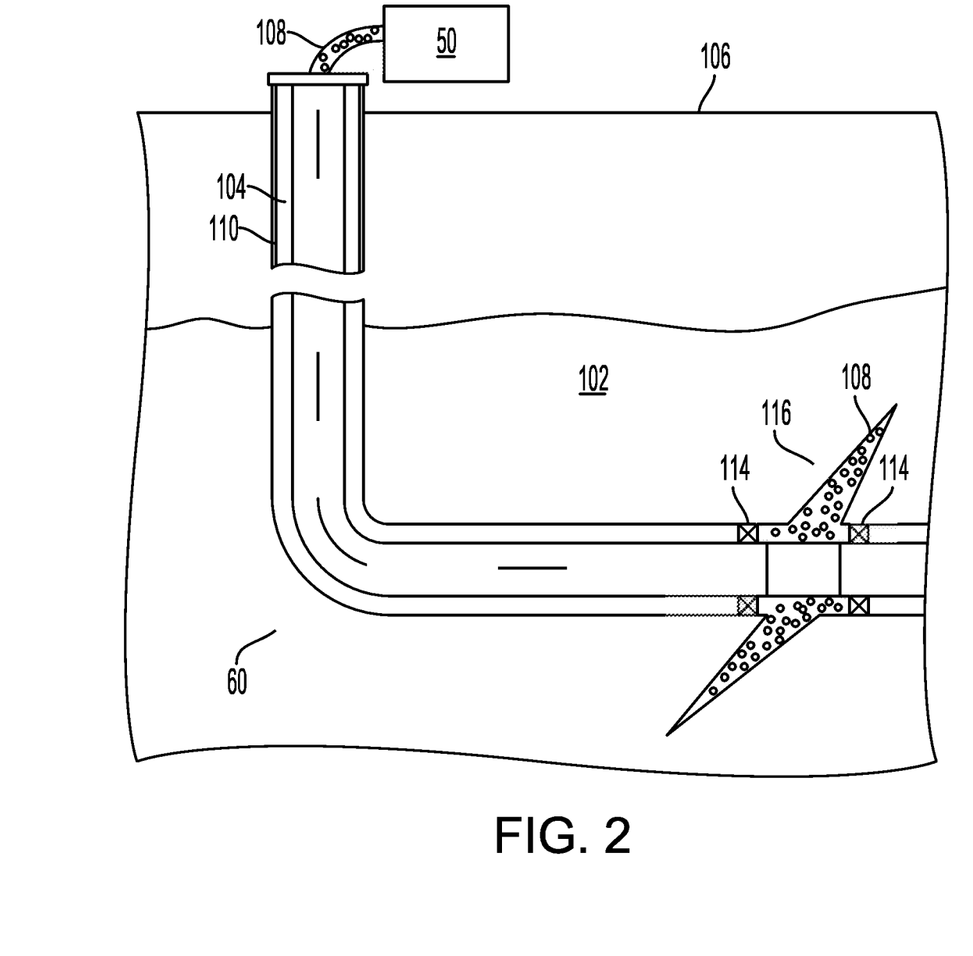
FIG. 2 shows a well during a fracturing operation in a portion of a subterranean formation of interest surrounding a wellbore, in accordance with various aspects of the subject technology.

FIG. 2 shows the well 60 during a fracturing operation in a portion of a subterranean formation of interest 102 surrounding a wellbore 104. The fracturing operation can be performed using one or an applicable combination of the components in the example fracturing system 10 shown in FIG. 1. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 can include horizontal, vertical, slant, curved, and other types of wellbore geometries and orientations, and the fracturing treatment can be applied to a subterranean zone surrounding any portion of the wellbore 104. The wellbore 104 can include a casing 110 that is cemented or otherwise secured to the wellbore wall. The wellbore 104 can be uncased or otherwise include uncased sections. Perforations can be formed in the casing 110 to allow fracturing fluids and/or other materials to flow into the subterranean formation 102. Perforations can be formed in the casing 110 using an applicable wireline-free actuation. In the example fracture operation shown in FIG. 2, a perforation is created between points 114.

The pump and blender system 50 is fluidly coupled to the wellbore 104 to pump the fracturing fluid 108, and potentially other applicable solids and solutions into the wellbore 104. When the fracturing fluid 108 is introduced into wellbore 104 it can flow through at least a portion of the wellbore 104 to the perforation, defined by points 114. The fracturing fluid 108 can be pumped at a sufficient pumping rate through at least a portion of the wellbore 104 to create one or more fractures 116 through the perforation and into the subterranean formation 102. Specifically, the fracturing fluid 108 can be pumped at a sufficient pumping rate to create a sufficient hydraulic pressure at the perforation to form the one or more fractures 116. Further, solid particles, e.g. proppant from the solid source 40, can be pumped into the wellbore 104, e.g. within the fracturing fluid 108 towards the perforation. In turn, the solid particles can enter the fractures 116 where they can remain after the fracturing fluid flows out of the wellbore. These solid particles can stabilize or otherwise "prop" the fractures 116 such that fluids can flow freely through the fractures 116.

While only two perforations at opposing sides of the wellbore 104 are shown in FIG. 2, greater than two perforations can be formed in the wellbore 104, e.g. along the top side of the wellbore 104, as part of a perforation cluster. Further, multiple perforation clusters can be included in or otherwise formed during a single fracturing stage. Fractures can then be formed through the plurality of perforations in the perforation cluster as part of a fracturing stage for the perforation cluster. Specifically, fracturing fluid and solid particles can be pumped into the wellbore 104 and pass through the plurality of perforations during the fracturing stage to form and stabilize the fractures through the plurality of perforations.

Figure 3:
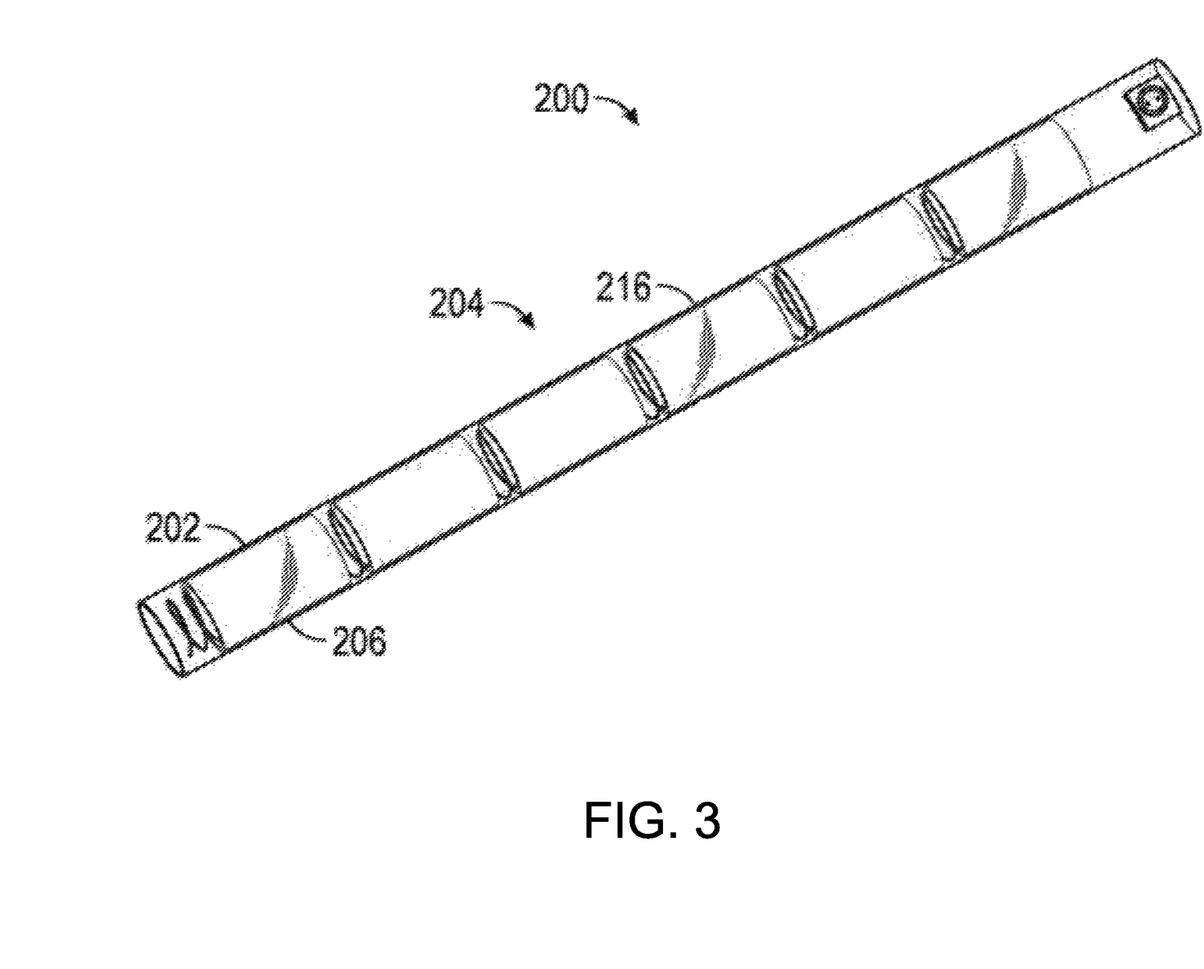
FIG. 3 shows an isometric view of an example fiber optic deployment device.

Turning to FIG. 3, a fiber optic deployment device 200 is shown. The device 200 can be deployed inside the casing of the wellbore 104 in any portion of the wellbore 104 and can be used to monitor a fracturing operation. As will be discussed in detail below, the device 200 can be deployed in a well adjacent to a well where the fracturing operation occurs or directly in a well of interest. The device 200 includes at least one fiber optic spool 202 forming a canister 204. When the device 200 includes a plurality of fiber optic spools, the plurality of fiber optic spools can be disposed adjacent to each other to form the canister 204. The canister 204 is operable to self-propel through at least a portion of the wellbore 104 and/or can self-propel throughout the length of the wellbore to a total depth. Each of the at least one fiber optic spool 202 includes one or more fiber optic lines 206. Though six fiber optic spools are illustrated, one skilled in the art would understand that less than six or more than six fiber optic spools may be used.

Each of the one or more fiber optic lines 206 can be in communication with at least one sensor disposed on a bridge plug 208 to provide measurement data for at least one wellbore characteristic (e.g., temperature, pressure, stress, strain, acoustics, vibration fracture growth rates, treatment rates). The at least one sensor can be an electrical sensor, an optical sensor, or a combination. A fiber optic line, as used herein, can be implemented through a fiber optic cable. Specifically, the fiber optic lines 206 can house one or more fibers. The fiber optic lines 206 can include single mode fibers, multi-mode fibers, or a combination of single mode and/or multi-mode optical fibers that provide measurement data for at least one wellbore characteristic.

The one or more fiber optic lines 206 can include a plurality of fibers spliced together to provide measurement data for a plurality of wellbore characteristics. Further, the one or more fiber optic lines 206 can be bend-insensitive or bend-improved to reduce optical loss from bending or coiling. The one or more fiber optic lines 206 can also include one or more layers of a protective buffer coating to minimize bend stress and/or to protect against environmental stresses (i.e., abrasion, chemical attack, hydrocarbons, fracturing fluids, etc.). The protective buffer coating can include, but is not limited to, metallic alloys, polyimide, polyether ether keytone, silicone, polyvinylidene fluoride, or acrylate.

Figure 4:
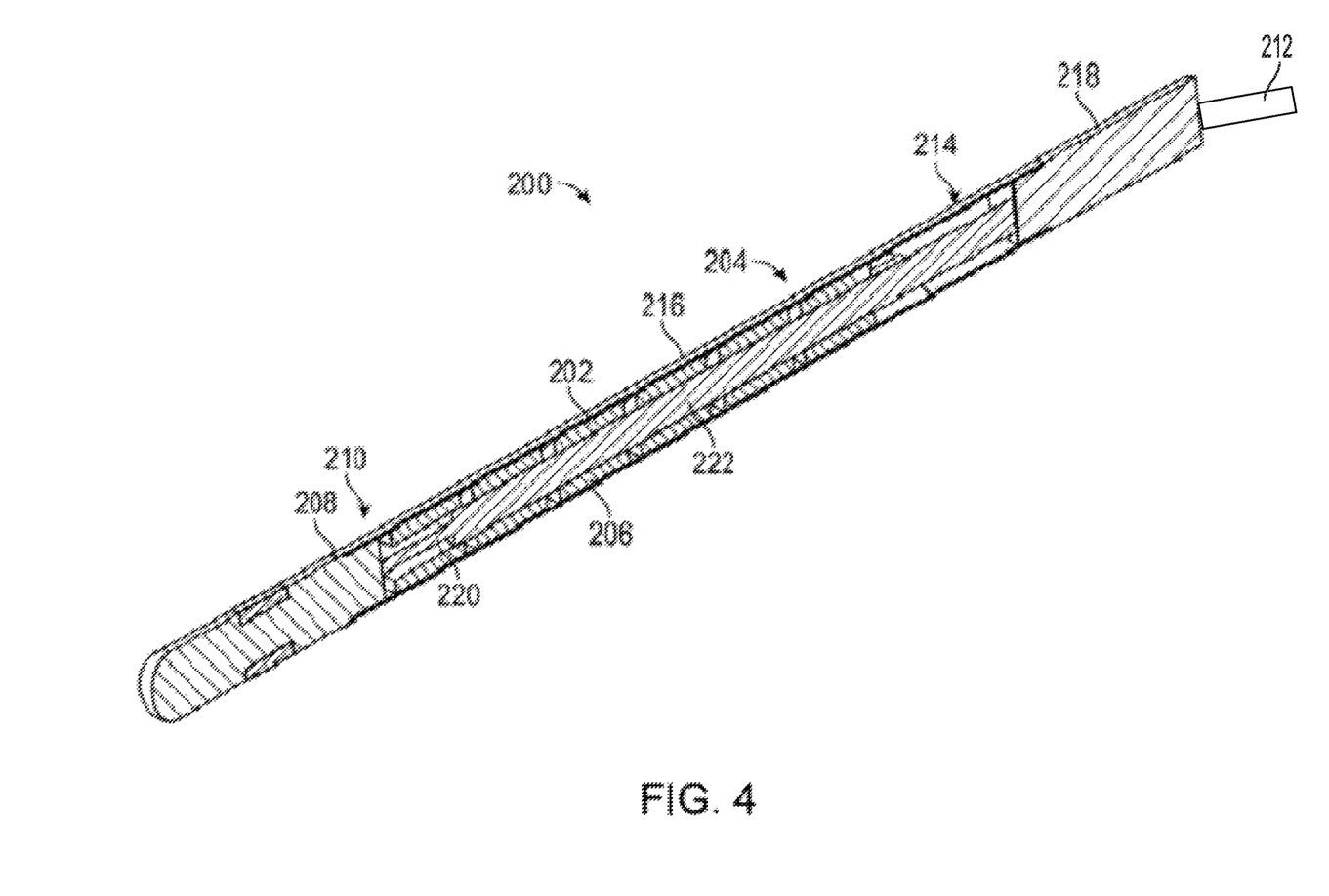
FIG. 4 shows a cross-section of the example device shown in FIG. 3 and an example tractor and an example bridge plug.

Each of the one or more fiber optic lines 206 can be coupled to a bridge plug 208 at a first end 210 and coupled to a cable 212 at a second end 214 opposite the first end 210. In some examples, the cable 212 can be a wireline cable. In some examples, the one or more fiber optic lines 206 can be coupled to a tractor 218 disposed between the second end 214 and the cable 212, as shown in FIG. 4. The tractor 218 can be operable to propel the device 200 in at least a portion of the wellbore 104 (e.g., a vertical portion, an angled portion, and/or a horizontal portion). In some examples, the tractor 218 can advantageously propel the device 200 through angled and/or horizontal portions of the wellbore 104, thereby dispersing the one or more fiber optic lines 206 in the angled and/or horizontal portions.

Each of the one or more fiber optic lines 206 can be dispersed from the corresponding at least one fiber optic spool 202 when the bridge plug 208 is secured within the wellbore 104 and the cable 212 is pulled, or retrieved, to the surface 106 of the wellbore 104. Such dispersing of the one or more fiber optic lines 206 is quick and easy to perform with minimal damage to the one or more fibers optic lines 206.

Turning to FIG. 4, the device 200 can further include an actuator 220 disposed in the canister 204 and adjacent to the bridge plug 208. The actuator 220 can be operable to secure the bridge plug 208 within the wellbore 104 by radially expanding the bridge plug 208 against the wellbore 104 or the casing, as shown in FIG. 5B, until a press fit is formed. The device 200 can also include a power unit 222 disposed in the canister 204 and operable to provide power to the actuator 220. The power unit 222 and the actuator advantageously provide securement of the bridge plug 208 to the wellbore 104 without adverse effects or damage to the one or more fiber optic lines 206.

The device 200 can include a sleeve 216 covering the at least one fiber optic spool 202. The sleeve 216 can provide protection for the at least one fiber optic spool 202, the power unit 222, and/or the actuator 220. The sleeve 216 can be releasably coupled to the bridge plug 208, the cable 212, and/or the tractor 218. The sleeve 216 can be continuous and cover each of the at least one fiber optic spools 202. In some examples, the sleeve 216 can include a plurality of sleeves coupled adjacently to each other and each of the plurality of sleeves can house a corresponding at least one fiber optic spool 202.

Turning to FIGS. 5A-5C and FIG. 6, cross-section views of the device 200 being deployed in the wellbore 104, the bridge plug 208 being secured to the wellbore 104, the device 200 being retrieved to the surface 106 of the wellbore 104, and a flow chart 600 illustrating an example method for deploying fiber optic lines 206 are respectively shown. For the sake of clarity, the method is described in terms of the system 200, as shown in FIGS. 3-5C, configured to practice the method. The steps outlined herein are exemplary and can be implemented in any combination thereof, including combinations that exclude, add, or modify certain steps.

Figure 5A:
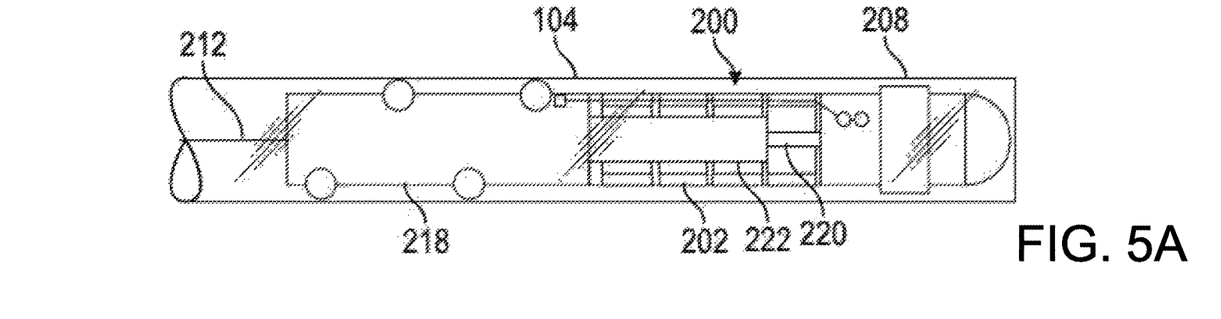
FIG. 5A shows a cross-section of the example device, tractor, and bridge plug in a wellbore.
Figure 5B:
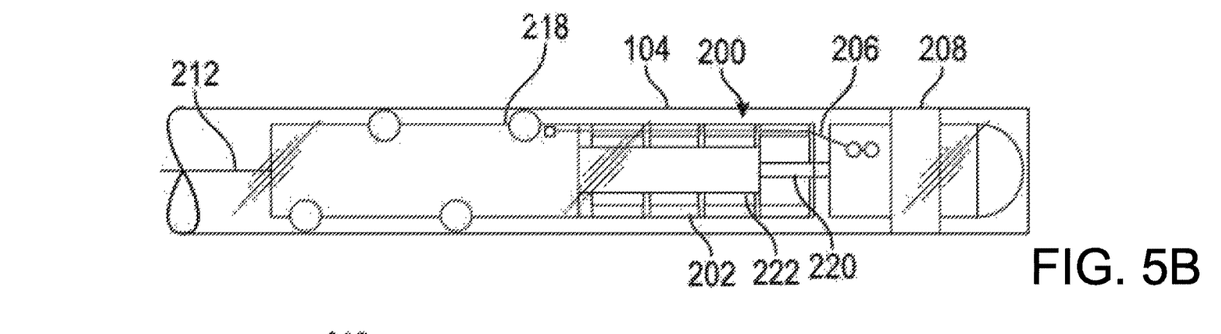
FIG. 5B shows a cross-section of the example bridge plug being secured within the wellbore.
Figure 6:
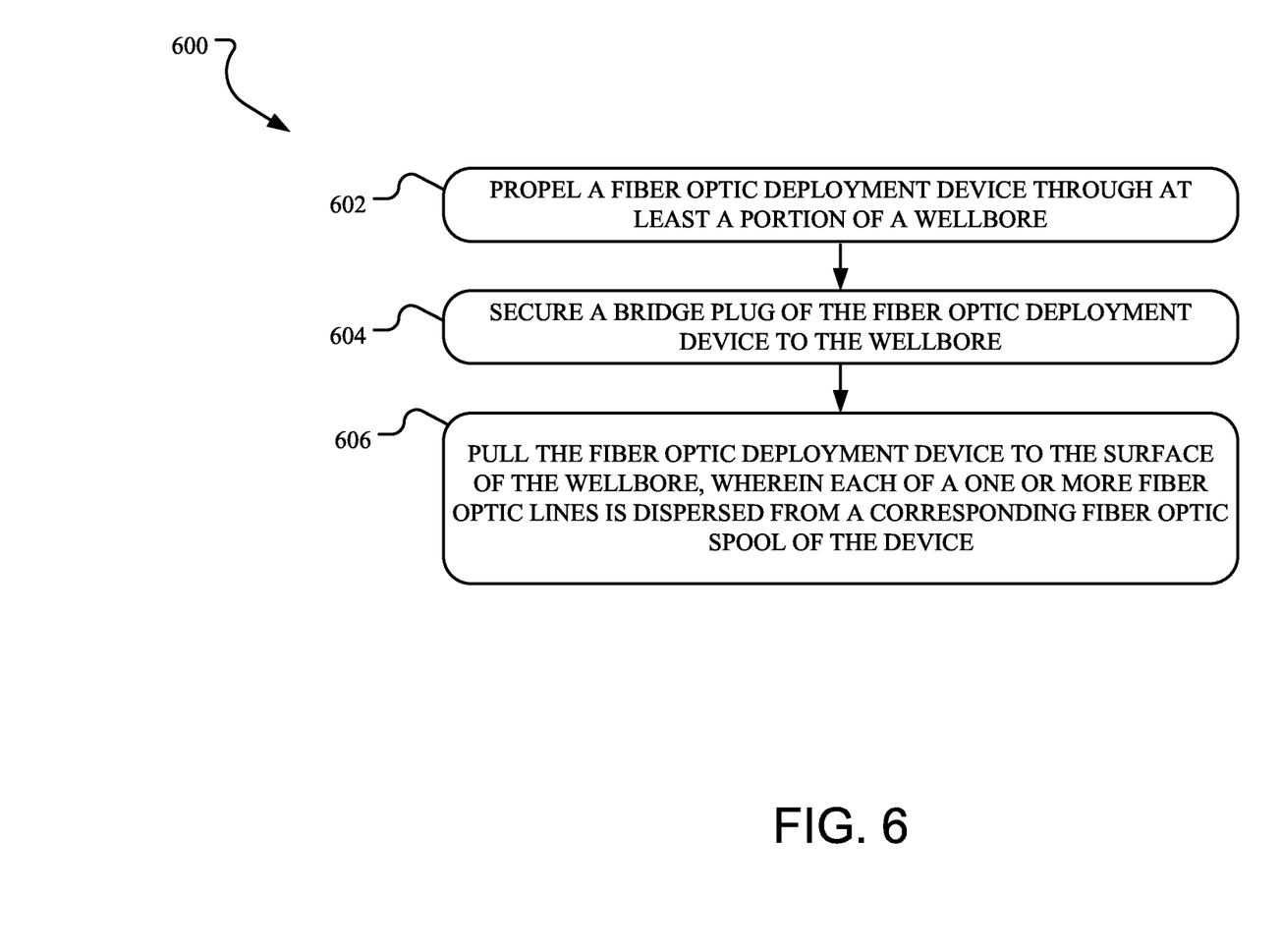
FIG. 6 is a flow chart illustrating a method for deploying fiber optics in a wellbore.

In step 602 and as illustrated in FIG. 5A, the device 200 is propelled through at least a portion of the wellbore 104. The device 200 can be propelled inside of a casing of the wellbore 104 and can be propelled through a vertical, an angled, and/or a horizontal portion of the wellbore 104, as previously described.

In step 604 and as illustrated in FIG. 5B, the bridge plug 208 is secured to the wellbore. As previously described, the bridge plug 208 can be secured to the wellbore by the actuator 220. As illustrated, the actuator 220 can expand the bridge plug 208 until a press fit is formed between the bridge plug 208 and the wellbore 104 or the casing.

Figure 5C:
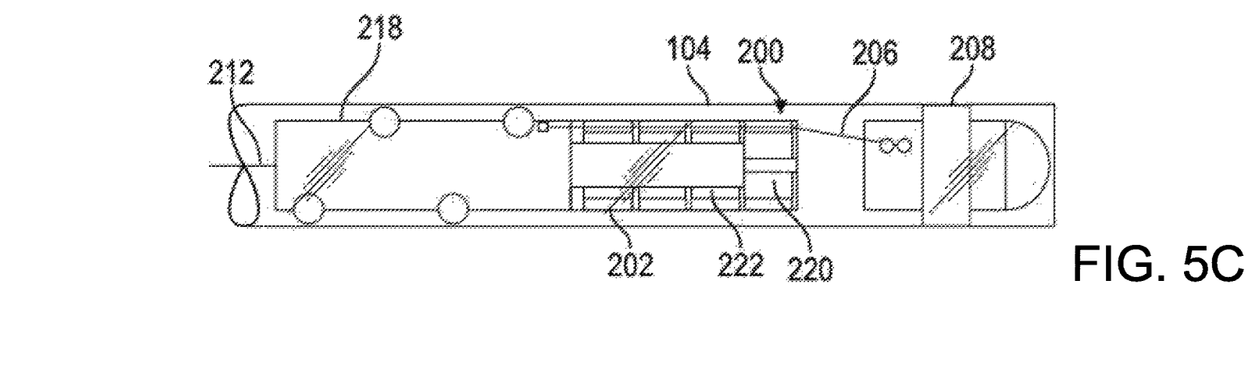
FIG. 5C shows a cross-section of the example device being pulled to a surface of the wellbore.

In step 606 and as illustrated in FIG. 5C, the device 200 is pulled or retrieved to the surface of the wellbore. During retrieval of the device 200, each of the one or more fiber optic lines 206 are dispersed from the corresponding at least one fiber optic spool 202. The at least one fiber optic spool 202 remains stationary within the device 200 as the one or more fiber optic lines 206 are dispersed. The one or more fiber optic lines 206 can disperse by unspooling from inside of the corresponding at least one fiber optic spool 202. Such unspooling advantageously does not require any additional mechanisms, motors, or power to disperse the one or more fiber optic lines 206, thereby dispersing the one or more fiber optic lines 206 in a quick, efficient, and cost-effective manner.

Though the one or more fiber optic lines 206 are shown deployed in one wellbore 104, the one or more fiber optic lines 206 can be deployed in more than one wellbore 104. The one or more fiber optic lines 206 can also be deployed permanently or temporarily in a wellbore. The measurement from one or more fiber optic lines 206 can be used to calculate, model and predict reservoir responses and then control or monitor a fracturing operation or to monitor a producing well. Such controlling or monitoring can be performed in real-time and can be used to, for example, timely predict well interference events for mitigation. Mitigating actions may include change of rate, proppant concentration, chemical concentration or diverter concentration in response to the measured, calculated and predicted response parameters. The calculated and predicted response parameters may include fracture length, fracture width, fracture growth, fracture and/or fracture network azimuth fracture volumes, length/width/height/volume growth rates. Mitigating actions can be planned based on predetermined boundaries where fracture length/width/height/volume are to be constrained within the predetermined boundaries where rate, proppant, diverter and chemicals may be controlled over time in response to models.

Figure 7:
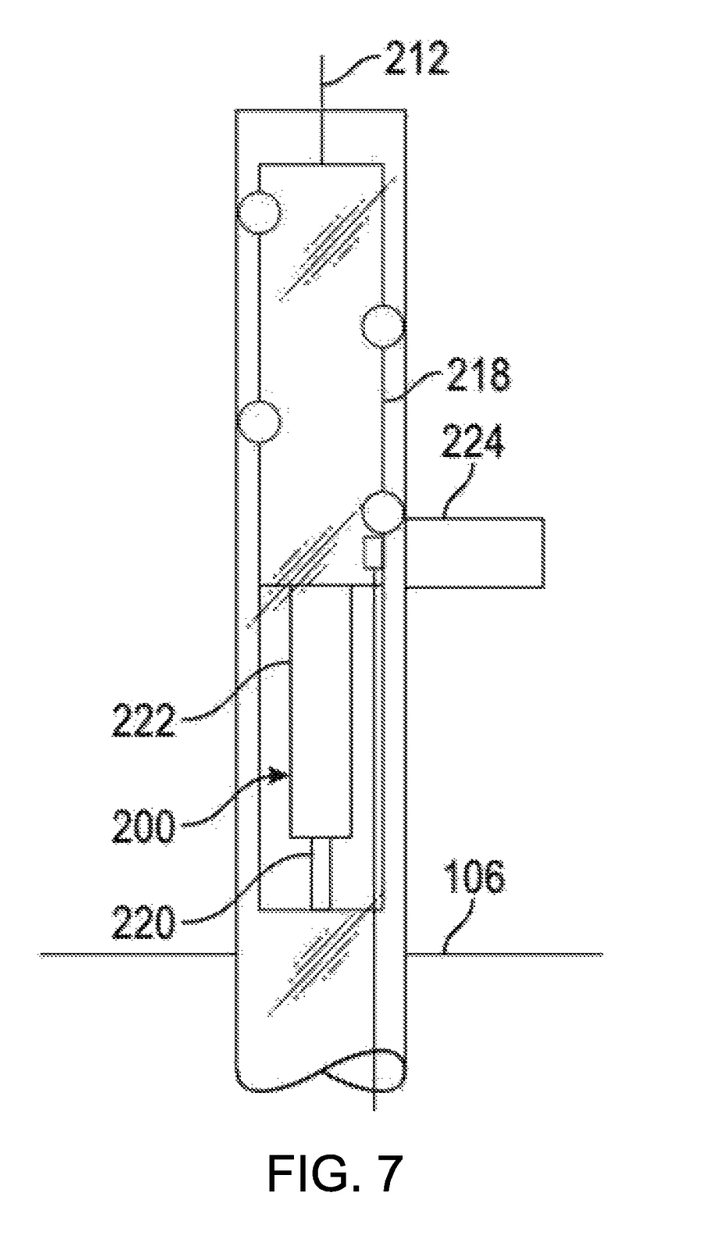
FIG. 7 shows a cross-section of the example device at the surface of the wellbore.
Figure 8:
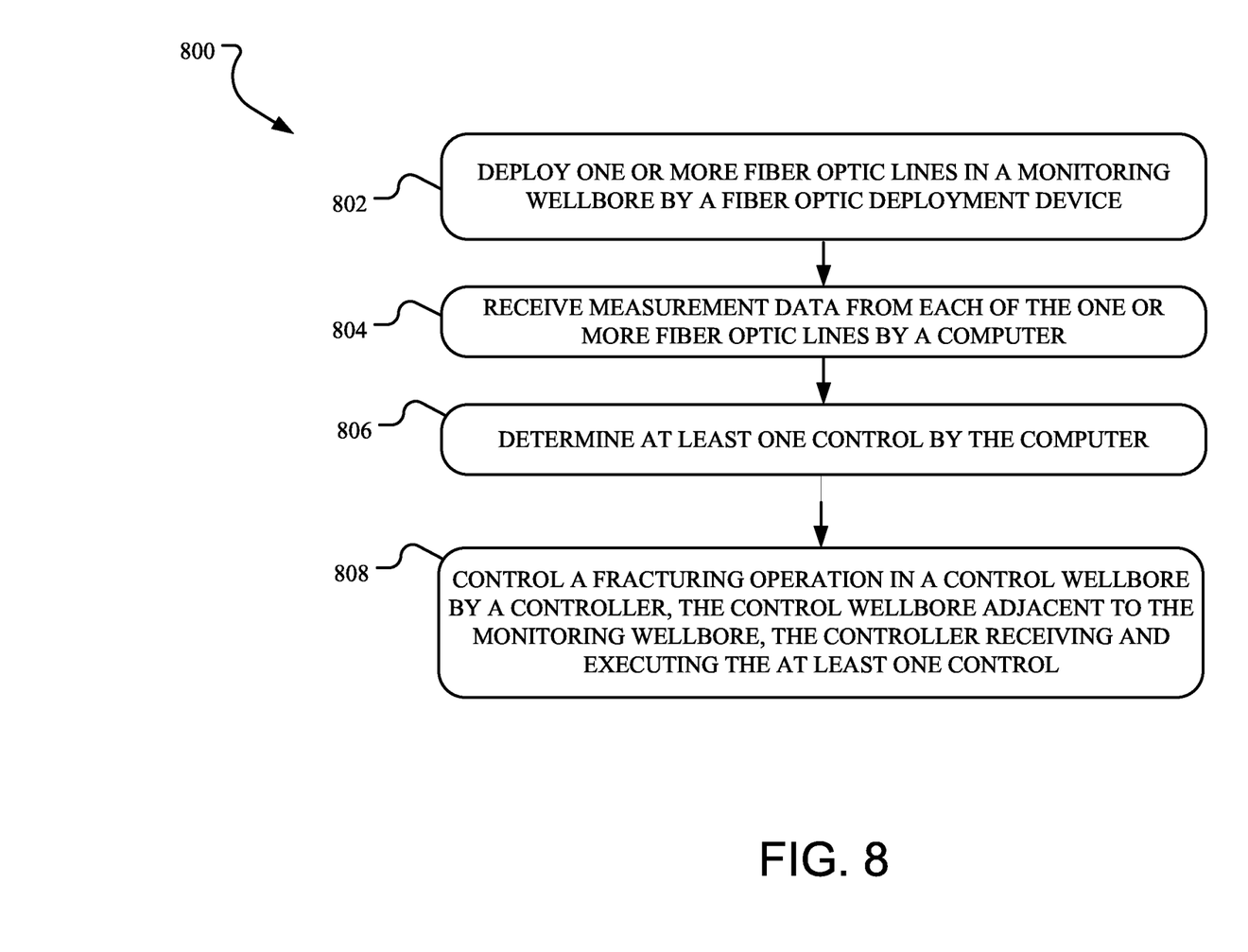
FIG. 8 is a flow chart illustrating a method for controlling a fracturing operation in a control wellbore.

Turning to FIGS. 7 and 8, a cross-section of the example device 200 at the surface 106 of the wellbore 104 and a flow chart 800 illustrating an example method for controlling a fracturing operation in a control wellbore are respectively shown. For the sake of clarity, the method is described in terms of the system 200, as shown in FIGS. 3-4 and 7, configured to practice the method. The steps outlined herein are exemplary and can be implemented in any combination thereof, including combinations that exclude, add, or modify certain steps.

In step 802, the one or more fiber optic lines 206 are deployed in a monitoring wellbore by the device 200. The monitoring wellbore can be adjacent to a control wellbore wherein at least one fracturing operation is performed. In other examples, the one or more fiber optic lines 206 can be deployed in a producing well to monitor production of the wellbore.

Figure 9:
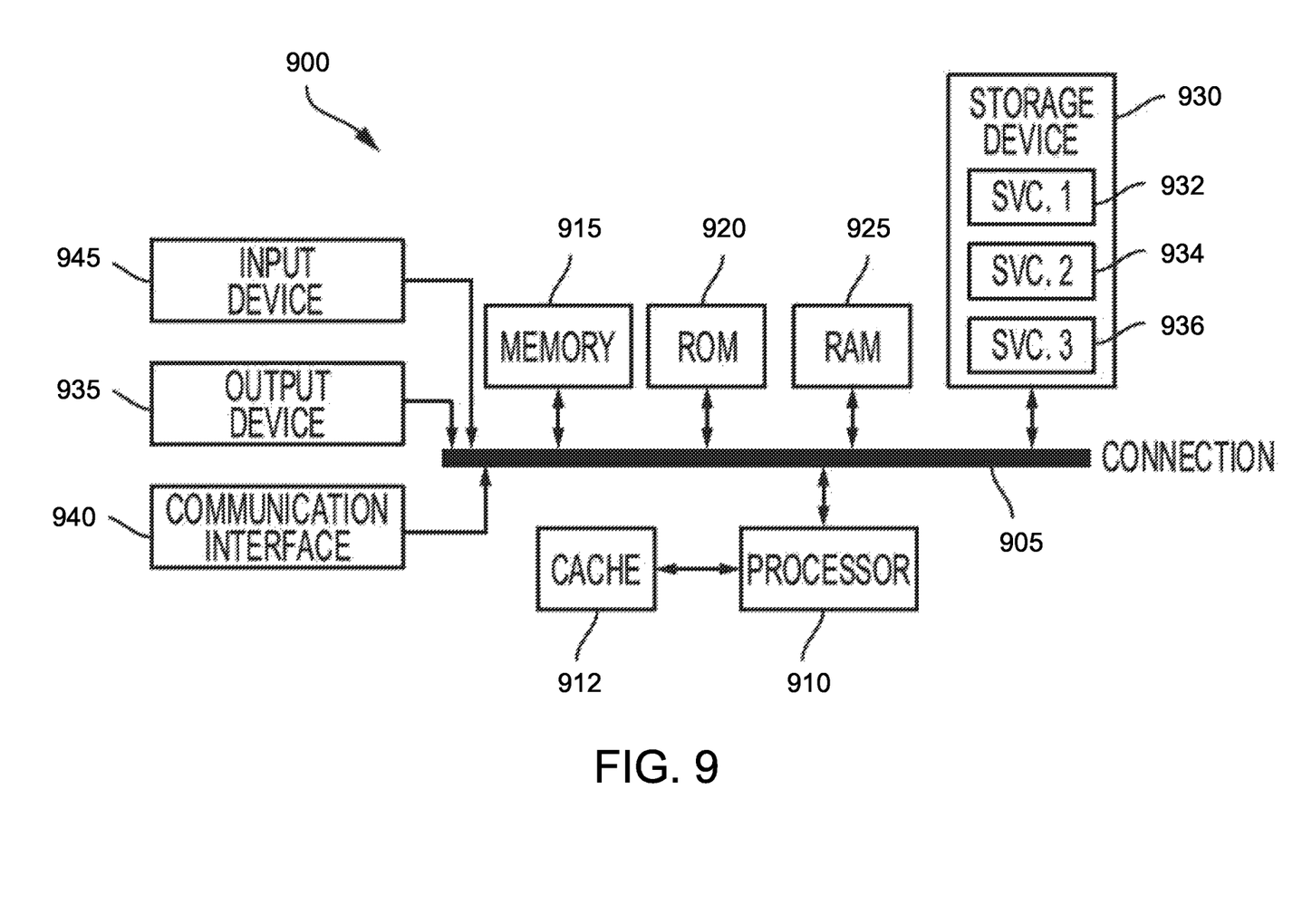
FIG. 9 is a schematic diagram of an example computing device architecture, in accordance with some examples.

In step 804, measurement data can be received by a computer (e.g., a computing device architecture 900 as described in detail with respect to FIG. 9) from each of the one or more fiber optic lines 206 after deployment of the one or more fiber optic lines 206. The measurement data can be received wirelessly or by wire to a computing device or other device for storage and/or processing. The data can correspond to characteristics of the control wellbore and/or the monitoring wellbore.

As shown in FIG. 7, a fiber optic sensing system 224 can be connected to the fiber optic lines 206 and can include, for example, a Distributed Temperature Sensing (DTS) system, a Distributed Acoustic Sensing (DAS) System, a Distributed Strain Sensing (DSS) System, a quasi-distributed sensing systems wherein multiple single point sensors are distributed along a fiber optic line, or a single point sensing systems wherein the sensors are located at an end of the fiber optic lines 206.

The fiber optic sensing system 224 can operate using various sensing principles including, but not limited to, an amplitude based sensing system (e.g., a DTS system based on Raman scattering); a phase or intensity sensing based system operating using Rayleigh scattering (e.g., a DAS system based on interferometric sensing using, for example, homodyne or heterodyne techniques where the system can sense phase or intensity changes due to constructive or destructive interference); a strain sensing system (e.g., a DSS using dynamic strain measurements based on interferometric sensors or static strain sensing measurements using, for example, Brillouin scattering); quasi-distributed sensors based on, for example, Fiber Bragg Gratings (FBGs) wherein a wavelength shift is detected or multiple FBGs are used to form Fabry-Perot type interferometric sensors for phase or intensity based sensing; or single point fiber optic sensors based on Fabry-Perot or FBG or intensity based sensors, or based on Michelson interferometric sensors, or based on Mach-Zehnder interferometric sensors.

In step 806, at least one control is determined by the computer. In some examples, one type of data (e.g., acoustic, strain, temperature, pressure, etc.) can be used to determine the at least one control. In other examples, a plurality of data types can be used to determine the at least one control.

For example, temperature measurements can be used to determine fluid volume placement for fracturing fluid placement, fluid communications between the monitoring well and the control well, and/or formation fluid movement.

In another example, acoustic data can be used to determine fluid allocation and can be converted from time series data to frequency domain data using transforms (i.e., Fast Fourier Transforms). The frequency data can be interpreted to, for example, signal changes in strain changes, fluid movement, or gas movement which can indicate formation movement, growing natural fractures, and/or changes during the fracturing operation (e.g., fluid seepage, fluid flow from fractures, proppant flow from fractures, formation stress changes, etc.). The frequency data can then be used to determine the at least one control.

In yet another example, acoustic data can also be used to detect various seismic events where stress fields and/or growing fracture networks generate microseimic events or where perforation charge events can be used to determine travel time between horizontal wells. Such data can be used from fracturing stage to fracturing stage to determine changes in travel time as a formation is fractured. The data can also be used with surface seismic sources to generate vertical seismic profiles before, during and after a fracturing operation to determine the effectiveness of the fracturing operation as well as determine production effectiveness.

In another example, strain data can be used to determine strain changes over time to determine proppant fracture volume, permeability, poroelastic responses, fracture growth, and leak-off rates during a fracturing operation. Such data can be used to determine the at least one control to adjust, for example, fluid flow rates, addition of diverters or chemicals, and/or proppant concentrations in the control wellbore.

In step 808, the fracturing operation can be controlled by a controller when the controllers receives and executes the at least one control. The controller can be separate from or part of the computer. The at least one control can correspond to controlling or changing a well pressure, flow rate, proppant concentration, diverters, fluids, and/or chemicals to affect the fracturing operation.

As noted above, FIG. 9 illustrates the example computing device architecture 900 of a computing device which can implement the various technologies and techniques described herein. For example, the computing device architecture 900 can perform various steps, methods, and techniques disclosed herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 can be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 can be a self-contained system, containing multiple cores or processors, a bus, memory controller, cache, etc. A multi-core processor can be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here can easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function. In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

For clarity of explanation, in some instances the present technology can be presented as including individual functional blocks including functional blocks comprising devices, device components, steps or routines in a method embodied in software, or combinations of hardware and software.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions can be, for example, binaries, intermediate format instructions such as assembly language, firmware, source code, etc. Examples of computer-readable media that can be used to store instructions, information used, and/or information created during methods according to described examples include magnetic or optical disks, flash memory, USB devices provided with non-volatile memory, networked storage devices, and so on.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts can be otherwise variously embodied and employed, and that the appended claims are intended to be construed to include such variations, except as limited by the prior art. Various features and aspects of the above-described subject matter can be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods can be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The term "coupled" is defined as connected, whether directly or indirectly through intervening components, and is not necessarily limited to physical connections. The connection can be such that the objects are permanently connected or releasably connected. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder. The term "radially" means substantially in a direction along a radius of the object, or having a directional component in a direction along a radius of the object, even if the object is not exactly circular or cylindrical.

Although a variety of information was used to explain aspects within the scope of the appended claims, no limitation of the claims should be implied based on particular features or arrangements, as one of ordinary skill would be able to derive a wide variety of implementations. Further and although some subject matter can have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A fiber optic deployment device for deploying fiber optic lines in a wellbore, the device comprising at least one fiber optic spool forming a canister, each of the at least one fiber optic spool comprising one or more fiber optic lines, each of the one or more fiber optic lines coupled to a bridge plug at a first end and coupled to a cable at a second end opposite the first end. The device can also include a sleeve covering the at least one fiber optic spool. Further, the canister can be operable to self-propel through at least a portion of the wellbore, and wherein each of the one or more fiber optic lines is dispersed from the corresponding at least one fiber optic spool when a bridge plug is secured within the wellbore and a cable is pulled to a surface of the wellbore.

Statement 2. The device of statement 1, further comprising a system including a bridge plug coupled to the first end of each of the one or more fiber optic lines. The system can also include a tractor coupled between the second end of each of the one or more fiber optic lines and the cable, the tractor operable to propel the fiber optic deployment device in at least a portion of the wellbore. Further, the system can include an actuator disposed in the canister and adjacent the bridge plug, the actuator securing the bridge plug within the wellbore by providing a force against the bridge plug to separate the bridge plug from the device and frictionally secure the bridge plug within the wellbore. Additionally, the system can include a power unit disposed in the canister and operable to provide power to the actuator.

Statement 3. The device of statements 1 and 2, wherein the known dataset associated with the oil based mud imager tool includes simulated tool measurements associated with the oil based mud imager tool corresponding to values of the mud and formation parameters used in a simulation.

Statement 4. The device of statements 1 through 3, wherein the device is deployed inside a casing disposed in the wellbore.

Statement 5. The device of statements 1 through 4, wherein the cable is a wireline cable.

Statement 6. The device of statements 1 through 5, wherein the one or more fiber optic lines includes a plurality of fiber optic lines spliced together.

Statement 7. The device of statements 1 through 6, wherein the device further comprises a computer receiving measurement data from the one or more fiber optic lines when the one or more fiber optic lines are deployed in an monitoring wellbore, the data corresponding to wellbore characteristics of a control wellbore, the control wellbore positioned adjacent to the monitoring wellbore, the computer determining at least one control based on the data. The device can also include a controller that controls a fracturing operation in the control wellbore based on the at least one control.

Statement 8. The device of statements 1 through 7, wherein each of the measurement data is at least one of temperature, pressure, stress, strain, and fluid allocation.

Statement 9. A method of deploying fiber optic lines in a wellbore comprising propelling a fiber optic deployment device through at least a portion of the wellbore, the fiber optic deployment device comprising at least one fiber optic spool forming a canister, each of the at least one fiber optic spool comprising the one or more fiber optic lines, each of the one or more fiber optic lines coupled to a bridge plug at a first end and coupled to a cable at a second end opposite the first end, and a sleeve covering the at least one fiber optic spool. The method can also include securing the bridge plug to the wellbore. Further, the method can include pulling the device to a surface of the wellbore, wherein each of the one or more fiber optic lines is dispersed from the corresponding at least one fiber optic spool.

Statement 10. The method of statement 9, wherein securing the bridge plug to the wellbore includes providing a force against the bridge plug by an actuator to separate the bridge plug from the device and frictionally secure the bridge plug within the wellbore.

Statement 11. The method of statements 9 and 10 further comprising propelling the device in at least one of an angled well and a horizontal well by a tractor coupled between the second end of each of the one or more fiber optic lines and the cable.

Statement 12. The method of statements 9 through 11, wherein the device is deployed inside a casing disposed in the wellbore.

Statement 13. The method of statements 9 through 12, wherein the cable is a wireline cable.

Statement 14. The method of statements 9 through 13, wherein the one or more fiber optic lines include a plurality of fiber optic lines spliced together.

Statement 15. The method of statements 9 through 14, the method further comprising deploying the device in a monitoring wellbore. The method can also include receiving measurement data from each of the one or more fiber optic lines by a computer, the data corresponding characteristics of a control wellbore, the control wellbore adjacent to the monitoring wellbore. Further, the method can include determining at least one control by the computer. Additionally, the method can include controlling a fracturing operation in the control wellbore by a controller, the controller receiving and executing the at least one control.

Statement 16. The method of statements 9 through 15, wherein each of the measurement data is at least one of temperature, pressure, stress, strain, vibration, and fluid allocation.

Statement 17. A method of controlling a fracturing operation in a control wellbore comprising deploying one or more fiber optic lines in a monitoring wellbore, the monitoring wellbore being adjacent to the control wellbore, the one or more fiber optic lines deployed by a fiber optic deployment device comprising at least one fiber optic spool forming a canister, each of the at least one fiber optic spool comprising the one or more fiber optic lines, each of the one or more fiber optic lines coupled to a bridge plug at a first end and coupled to a cable at a second end opposite the first end, and a sleeve covering the at least one fiber optic spool, wherein each of the one or more fiber optic lines is dispersed from the corresponding at least one fiber optic spool when a bridge plug is secured within the monitoring wellbore and a cable is pulled to a surface of the monitoring wellbore. The method can also include receiving measurement data from each of the one or more fiber optic lines by a computer, the data corresponding to characteristics of the control wellbore. Further, the method can include determining at least one control by the computer. Additionally, the method can include controlling the fracturing operation in the control wellbore by a controller, the controller receiving and executing the at least one control.

Statement 18. The method of statement 17, the method further comprising sensing the measurement data using a fiber optic sensing system, the fiber optic sensing system using a sensing principal to sense the measurement data.

Statement 19. The method of statements 17 and 18, wherein the sensing principal is at least one of Raman scattering, Rayleigh scattering, Brillouin scattering, Fiber Bragg Gratings, one or more of Fabry-Perot, Michelson, and Mach-Zehnder interferometers, a heterodyne interferometric sensing technique, and a homodyne interferometric sensing technique.

Statement 20. The method of statements 17 through 19, wherein each of the measurement data is at least one of temperature, pressure, stress, strain, vibration, and fluid allocation.

What is claimed is:

1. A fiber optic deployment device for deploying fiber optic lines in a wellbore, the device comprising:
   at least one fiber optic spool forming a canister, each of the at least one fiber optic spool comprising one or more fiber optic lines, each of the one or more fiber optic lines coupled to a bridge plug at a first end and coupled to a cable at a second end opposite the first end; and
   a sleeve covering the at least one fiber optic spool;
   wherein the canister is operable to self-propel through at least a portion of the wellbore, and wherein each of the one or more fiber optic lines is dispersed from the corresponding at least one fiber optic spool when a bridge plug is secured within the wellbore and a cable is pulled to a surface of the wellbore.

2. The fiber optic deployment device of claim 1, further comprising a system comprising:
   a bridge plug coupled to the first end of each of the one or more fiber optic lines,
   a tractor coupled between the second end of each of the one or more fiber optic lines and the cable, the tractor operable to propel the fiber optic deployment device in at least a portion of the wellbore,
   an actuator disposed in the canister and adjacent the bridge plug, the actuator securing the bridge plug within the wellbore by providing a force against the bridge plug to separate the bridge plug from the device and frictionally secure the bridge plug within the wellbore, and
   a power unit disposed in the canister and operable to provide power to the actuator.

3. The fiber optic deployment device of claim 1, wherein the device is deployed inside a casing disposed in the wellbore.

4. The fiber optic deployment device of claim 1, wherein the device is deployed inside at least one of a horizontal wellbore, an angled wellbore, and a vertical wellbore.

5. The fiber optic deployment device of claim 1, wherein the cable is a wireline cable.

6. The fiber optic deployment device of claim 1, wherein the one or more fiber optic lines includes a plurality of fiber optic lines spliced together.

7. The fiber optic deployment device of claim 1, further comprising a system comprising:
   a computer receiving measurement data from the one or more fiber optic lines when the one or more fiber optic lines are deployed in an monitoring wellbore, the data corresponding to wellbore characteristics of a control wellbore, the control wellbore positioned adjacent to the monitoring wellbore, the computer determining at least one control based on the data; and
   a controller that controls a fracturing operation in the control wellbore based on the at least one control.

8. The fiber optic deployment device of claim 7, wherein each of the measurement data is at least one of temperature, pressure, stress, strain, and fluid allocation.

9. A method of deploying fiber optic lines in a wellbore, the method comprising:
   propelling a fiber optic deployment device through at least a portion of the wellbore, the fiber optic deployment device comprising at least one fiber optic spool forming a canister, each of the at least one fiber optic spool comprising the one or more fiber optic lines, each of the one or more fiber optic lines coupled to a bridge plug at a first end and coupled to a cable at a second end opposite the first end, and a sleeve covering the at least one fiber optic spool;
   securing the bridge plug to the wellbore; and
   pulling the device to a surface of the wellbore, wherein each of the one or more fiber optic lines is dispersed from the corresponding at least one fiber optic spool.

10. The method of claim 9, wherein securing the bridge plug to the wellbore includes providing a force against the bridge plug by an actuator to separate the bridge plug from the device and frictionally secure the bridge plug within the wellbore.

11. The method of claim 9, further comprising propelling the device in at least one of an angled well and a horizontal well by a tractor coupled between the second end of each of the one or more fiber optic lines and the cable.

12. The method of claim 9, wherein the device is deployed inside a casing disposed in the wellbore.

13. The method of claim 9, wherein the cable is a wireline cable.

14. The method of claim 9, wherein the one or more fiber optic lines include a plurality of fiber optic lines spliced together.

15. The method of claim 9, further comprising:
deploying the device in a monitoring wellbore;
receiving measurement data from each of the one or more fiber optic lines by a computer, the data corresponding characteristics of a control wellbore, the control wellbore adjacent to the monitoring wellbore;
determining at least one control by the computer; and
controlling a fracturing operation in the control wellbore by a controller, the controller receiving and executing the at least one control.

16. The method of claim 15, wherein each of the measurement data is at least one of temperature, pressure, stress, strain, vibration, and fluid allocation.

17. A method of controlling a fracturing operation in a control wellbore comprising:
deploying one or more fiber optic lines in a monitoring wellbore, the monitoring wellbore being adjacent to the control wellbore, the one or more fiber optic lines deployed by a fiber optic deployment device comprising at least one fiber optic spool forming a canister, each of the at least one fiber optic spool comprising the one or more fiber optic lines, each of the one or more fiber optic lines coupled to a bridge plug at a first end and coupled to a cable at a second end opposite the first end, and a sleeve covering the at least one fiber optic spool, wherein each of the one or more fiber optic lines is dispersed from the corresponding at least one fiber optic spool when a bridge plug is secured within the monitoring wellbore and a cable is pulled to a surface of the monitoring wellbore;
receiving measurement data from each of the one or more fiber optic lines by a computer, the data corresponding to characteristics of the control wellbore;
determining at least one control by the computer; and
controlling the fracturing operation in the control wellbore by a controller, the controller receiving and executing the at least one control.

18. The method of claim 17, further comprising sensing the measurement data using a fiber optic sensing system, the fiber optic sensing system using a sensing principal to sense the measurement data.

19. The method of claim 18, wherein the sensing principal is at least one of Raman scattering, Rayleigh scattering, Brillouin scattering, Fiber Bragg Gratings, one or more of Fabry-Perot, Michelson, and Mach-Zehnder interferometers, a heterodyne interferometric sensing technique, and a homodyne interferometric sensing technique.

20. The method of claim 17, wherein each of the measurement data is at least one of temperature, pressure, stress, strain, vibration, and fluid allocation.

\* \* \* \* \*